(12) United States Patent
Doering

(10) Patent No.: US 9,140,625 B2
(45) Date of Patent: *Sep. 22, 2015

(54) METHOD AND DEVICE FOR OPERATING A SENSOR FOR DETERMINING EXHAUST GAS COMPONENTS, IN PARTICULAR FOR A MOTOR VEHICLE

(71) Applicant: MAN Truck & Bus AG, Munich (DE)

(72) Inventor: Andreas Doering, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,625

(22) Filed: Nov. 8, 2013

(65) Prior Publication Data

US 2014/0130589 A1 May 15, 2014

(30) Foreign Application Priority Data

Nov. 9, 2012 (DE) .......................... 10 2012 021 929

(51) Int. Cl.
| | |
|---|---|
| *G01M 15/10* | (2006.01) |
| *F01N 13/00* | (2010.01) |
| *F02D 41/14* | (2006.01) |
| *F02B 37/16* | (2006.01) |
| *F02D 41/22* | (2006.01) |
| *F02D 41/00* | (2006.01) |

(52) U.S. Cl.
CPC ........... *G01M 15/102* (2013.01); *F01N 13/008* (2013.01); *F02B 37/168* (2013.01); *F02D 41/1463* (2013.01); *F01N 2550/14* (2013.01); *F01N 2560/02* (2013.01); *F01N 2560/05* (2013.01); *F02D 41/0007* (2013.01); *F02D 41/222* (2013.01); *Y02T 10/144* (2013.01)

(58) Field of Classification Search
USPC ....................................... 73/114.73
See application file for complete search history.

(56) References Cited

U.S. PATENT DOCUMENTS

| | | | | |
|---|---|---|---|---|
| 5,357,749 | A * | 10/1994 | Ohsuga et al. ................... | 60/274 |
| 5,426,934 | A * | 6/1995 | Hunt et al. ........................ | 60/276 |
| 6,360,732 | B1 * | 3/2002 | Bailey et al. .............. | 123/568.12 |
| 7,255,098 | B1 * | 8/2007 | Boley et al. .................... | 123/679 |
| 7,263,823 | B2 * | 9/2007 | Andrews et al. ................ | 60/288 |
| 8,707,935 | B2 * | 4/2014 | Weber et al. .............. | 123/568.12 |
| 2005/0262833 | A1 | 12/2005 | Andrews et al. | |
| 2010/0107631 | A1 * | 5/2010 | Pearson ........................ | 60/605.2 |
| 2011/0094482 | A1 * | 4/2011 | Weber et al. .............. | 123/568.12 |
| 2011/0282539 | A1 * | 11/2011 | Inoue .............................. | 701/29 |
| 2014/0130569 | A1 * | 5/2014 | Doering ......................... | 73/1.06 |
| 2014/0223890 | A1 * | 8/2014 | Weber et al. .................... | 60/287 |

FOREIGN PATENT DOCUMENTS

| | | |
|---|---|---|
| DE | 34 28 232 A1 | 2/1986 |
| DE | 101 00 420 A1 | 7/2002 |

\* cited by examiner

*Primary Examiner* — Freddie Kirkland, III
(74) *Attorney, Agent, or Firm* — Lucas & Mercanti, LLP

(57) ABSTRACT

A method and a device for operating a sensor is provided in an exhaust gas system of an internal combustion engine for determining the emissions contained in an exhaust gas flow, in particular, of nitrogen oxides, ammonia, oxygen and/or unburnt carbon, with the exhaust gas flow acting on the sensor during measurement phases. Between the measurement phases, the sensor is at least largely kept free from the exhaust gas flow, wherein the duration and/or the frequency of the measurement phases can be set as a function of operating parameters of the internal combustion engine and/or of the exhaust gas regulation system. A measurement space which surrounds the sensor is exposed to a pressurized flushing gas immediately after a measurement phase, as a result of which the exhaust gas present in the measurement space is displaced out of the measurement space into the exhaust gas flow.

26 Claims, 3 Drawing Sheets

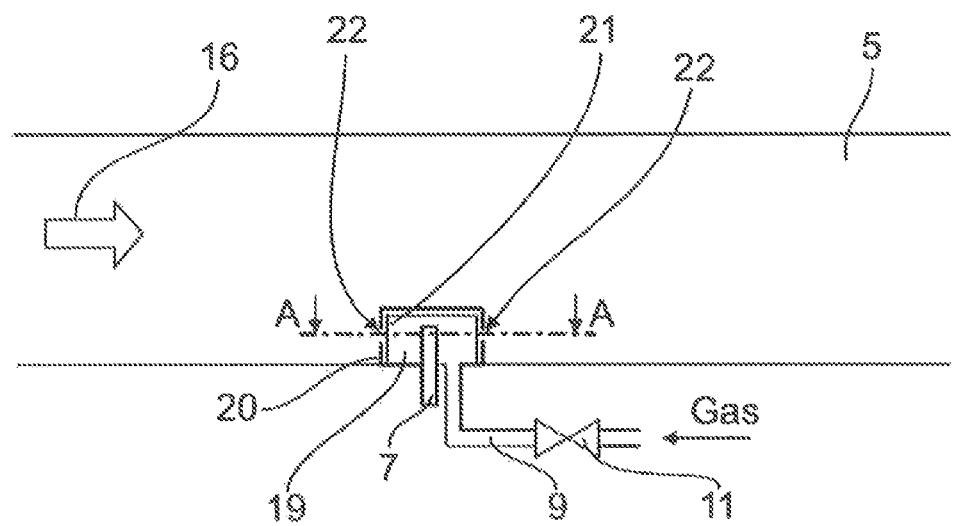
Fig. 3
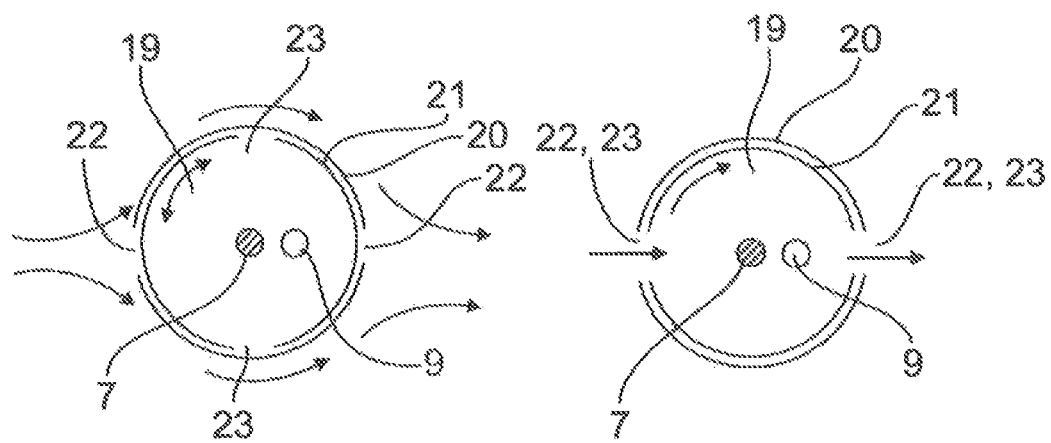
Fig. 4
Fig. 5

METHOD AND DEVICE FOR OPERATING A SENSOR FOR DETERMINING EXHAUST GAS COMPONENTS, IN PARTICULAR FOR A MOTOR VEHICLE

CROSS-REFERENCE TO RELATED APPLICATIONS

This application claims the priority of DE 10 2012 021 929.6 filed Nov. 9, 2012, which is incorporated by reference herein.

BACKGROUND OF THE INVENTION

The invention relates to a method for operating a sensor, in particular a $NO_X$ sensor, for determining exhaust gas components, in particular for a motor vehicle, and a device for operating such a sensor.

Alongside solid particles, nitrogen oxides belong to the limited exhaust gas components which are generated during combustion processes and the permitted emissions of which are being continuously reduced. A variety of methods are currently used in order to minimize these exhaust gas components in the case of internal combustion engines operated in motor vehicles. Reducing nitrogen oxides can be carried out by means of catalytic systems, with reducing agents additionally being used in oxygen-rich exhaust gas. These methods are known under the collective term SCR methods, with SCR denoting "selective catalytic reduction". A detailed explanation of such methods can be found in DE 34 28 232 A1.

In practical applications, ammonia or ammonia-eliminating compounds, such as urea or ammonium formate, in a solid or solution form are used as reducing agents.

In order to be able to carry out an effective catalytic reduction, for example, with the selective addition of urea, it is necessary to perform a determination of $NO_X$ emissions by means of $NO_X$ sensors. A method for controlling an exhaust gas after-treatment system is described in DE 101 00 420 A1, in which a predefinable quantity of reducing agent is supplied as a function of the status of the internal combustion engine and/or of the exhaust gas after-treatment system.

The $NO_X$ sensors used are very sensitive to alkali and alkaline earth metals by which they are irreversibly damaged. Alkali and alkaline earth metals enter into the exhaust gas via the fuel and the engine oil and from there come into contact with the $NO_X$ sensors which are arranged in the exhaust gas system. Particularly when using heavy oil, as is used in the case of large ship engines, large quantities of metal enter into the exhaust gas system which lead to damage of the $NO_X$ sensors installed there.

US 2005/0262833 A1 discloses a method for operating a $NO_X$ sensor in which the $NO_X$ sensor is only at times exposed to the exhaust gas flow in a bypass line of an exhaust gas channel. A connection to the ambient air is established in measurement pauses.

SUMMARY OF THE INVENTION

The object on which the invention is based is to indicate as effective as possible a method for operating a sensor for determining exhaust gas components, in particular for determining $NO_X$, in an exhaust gas system of an internal combustion engine, in particular of an internal combustion engine of a motor vehicle with which the service life of the sensor can be extended.

The object is achieved in that, immediately after a measurement phase, a measurement space which surrounds the sensor, in particular a $NO_X$ sensor, is exposed to a pressurized flushing gas, as a result of which the exhaust gas present in the measurement space is displaced out of the measurement space into the exhaust gas flow. The exhaust gas flow acts on the sensor, for example, a $NO_X$ sensor, only during predefined measurement phases, with the sensor being relieved of exhaust gas between the measurement phases. The duration and/or the frequency of the measurement phases can preferably be set as a function of operating parameters of the internal combustion engine. In the case of internal combustion engines which are operated with a constant load and rotational speed over longer periods of time, measurement phases at larger time intervals are sufficient so that the sensor is not exposed to any exhaust gas loading for comparatively large periods of time between the measurement phases, as a result of which a significant increase in its service life is achieved. However, if an internal combustion engine is in a changeable operating state, i.e. in non-stationary operation, measurement phases which occur at short consecutive intervals can be provided. It is, however, fundamentally also possible to extend the provided measurement phases to such an extent that critical operating states are monitored continuously by the sensor. The method for operating a sensor can thus be adapted to the respective requirements such that the measurement data required for exhaust gas after-treatment are also determined reliably and comprehensively in the case of different operating states of an internal combustion engine.

It is particularly advantageous that the sensor is relieved of the exhaust gas which surrounds it with a flushing gas, preferably with air, between the measurement phases, in particular in short measurement pauses in which it is not exposed to the exhaust gas flow. It is thus ensured that where possible no damaging exhaust gas components act on the sensor in the measurement pauses and an improvement in long-term properties is achieved.

It can also be provided in the case of the method according to the invention that calibration gas is fed into a measurement space which surrounds the sensor in calibration phases. This calibration can be performed at larger intervals of time in order, for example, to be able to balance out operation duration-dependent changes in the measurement properties by a calibration of the sensor.

The supply of flushing gas to the sensor can be carried out by means of a fan or a compressor. If air is used as the flushing gas, this air can be removed from the air flow of a compressor, in particular if this is in any event present for the turbocharging of the internal combustion engine.

The duration and/or the frequency of the measurement phases can also be carried out as a function of the exhaust gas system of the internal combustion engine, with the status of the overall system preferably being called on to control the duration and/or frequency of the measurement phases. By taking into account different parameters of the overall system, a very precise determination of the duration and/or frequency of the measurement phases can be carried out in order on one hand to obtain meaningful and as precise as possible measurement results and on the other hand, however, provide not unnecessarily long and frequent measurement phases. High measurement precision and a long service life can thus be optimally achieved for the sensor.

When monitoring the overall system for determining the duration and frequency of the measurement phases, in each case current or also differentiated parameters of the internal combustion engine, such as injection pressure, start of injection, boost pressure, charge air temperature, number of operated cylinders, turbocharger rotational speed, raw emissions, number of injections, and/or of the exhaust gas system, such as exhaust gas temperatures, catalytic converter temperatures, fuel consumed, quantity of reducing agent supplied, can be taken into account.

In order to expose the sensor to exhaust gas as quickly as possible in the measurement phases, it can be expedient to suck in exhaust gas in the direction of the sensor during the measurement phases. This can be provided via a fluidic connection between the measurement space and the fresh air intake side of the internal combustion engine, downstream of the fresh air filter and upstream of any compressor which is present. As a result of the vacuum which is present at this point during operation, exhaust gas is sucked into the measurement space and subsequently into the fresh air tract. In order to avoid corrosion occurring on the engine as a result of sulphur compounds, such as sulphuric acid or sulphurous acid, a sulphur trap can be integrated into this fluidic connection between the measurement space and the fresh air intake side of the internal combustion engine in order to filter sulphur oxides out of the exhaust gas.

According to one particularly preferred embodiment, it is proposed to bring about the suction of exhaust gas into the measurement space with the help of a jet pump (often also referred to as an ejector pump) or Venturi nozzle and use compressed air or, in the case of turbocharged internal combustion engines, compressed charge air as the propellant. With the help of the propellant (charge air or compressed air from any other suitable pressurizing medium source), exhaust gas can be sucked into the measurement space by virtue of the fact that the measurement space is connected fluidically to the intake side of the air-jet pump or the Venturi nozzle.

The further object on which the invention is based is to create a device for operating a sensor, in particular a $NO_X$ sensor, in an exhaust gas system with which a mode of operation which protects the sensor is possible.

According to an embodiment of the invention, the sensor is arranged in a measurement space which has a shielding device to the exhaust gas channel of the internal combustion engine, wherein flushing gas can be introduced via a gas channel into the measurement space by means of a supply device, preferably by means of a pump, a compressor or any other pressure generator. The shielding device serves in this context such that the flushing gas introduced into the measurement space in measurement pauses displaces exhaust gas present in the measurement space out of the measurement space so that the sensor in the measurement pauses is free from damaging influences which result from exhaust gas components. A generally very gentle operation is thus produced for the sensor which thus has a significantly longer service life than if the sensor had been continuously exposed to the damaging exhaust gas components.

A gas-permeable membrane can serve as a shielding device, which membrane represents a gas-permeable shield between a measurement space and an exhaust gas channel which adjoins this. The gas-permeable membrane thus extends across an opening which connects the measurement space to the exhaust gas channel. If flushing gas is now introduced into the measurement space, the flushing gas thus displaces the exhaust gas located in the measurement space through the gas-permeable membrane, as a result of which the sensor is in a measurement pause. If the introduction of flushing gas into the measurement space is now terminated, exhaust gas can penetrate back into the measurement space so that a measurement can be carried out.

The measurement space can, however, also be formed as a measurement space which can be entirely separated from the exhaust gas flow, which measurement space is only opened during the measurement phases for the introduction of exhaust gas. Such a measurement space can be formed by two concentrically arranged, perforated cylinders which are permeable or impermeable to the exhaust gas flow by means of a mutual rotation. The formation of a measurement space by means of two concentric cylinders results in a very simple and operationally reliable structure for a measurement space which can be shut off from the exhaust gas flow.

An intake device can be connected to the measurement space, which intake device sucks in exhaust gas into the measurement space during a measurement phase. Intake is preferably performed via a fluidic connection between the measurement space and the fresh air intake side of the engine.

So that no sulphur compounds are sucked out of the exhaust gas via the fresh air intake side of the engine out of the measurement space to the engine, a filter cartridge can be arranged between the measurement space and fresh air intake side of the engine. Such a filter cartridge can also be referred to as a sulphur trap which contains compounds such as $Ca(OH)_2$, activated carbon or CaO which are suitable for bonding sulphur oxides from the exhaust gas.

The measurement chamber in which the sensor is located can very advantageously also be exposed to a calibration gas, which has a defined concentration, via a gas channel. The sensor can thus be calibrated at preferably larger time intervals in order to achieve an equalization of the so-called sensor drift as a result of long-term influences. The measurement chamber which can be shielded off from the exhaust gas channel also has the advantage that only small quantities of calibration gas are required in order to fill the measurement space, which has correspondingly small dimensions, with calibration gas.

The invention is explained in greater detail below on the basis of exemplary embodiments represented in the drawing.

BRIEF DESCRIPTION OF THE DRAWINGS

In the drawings:

FIG. 3 shows a measurement space formed in an exhaust gas channel with a sensor, FIG. 4 shows a sectional view along line of intersection AA in the region of the measurement space of FIG. 3 which is formed by two cylinders arranged inside one another, and FIG. 5 shows a sectional view along line of intersection AA as in the case of FIG. 4, but with an inner cylinder rotated by 90 degrees.

DETAILED DESCRIPTION OF THE PREFERRED EMBODIMENTS

Figure 1:
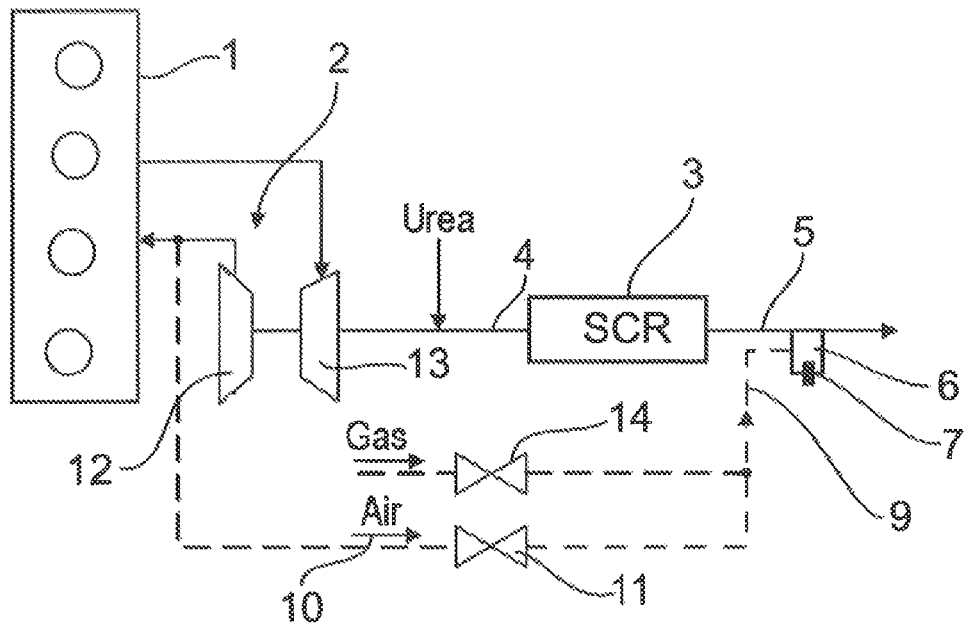
FIG. 1 shows a schematic representation of an internal combustion engine with an exhaust gas after-treatment system to which a sensor is connected.

FIG. 1 shows, by way of example, an internal combustion engine with an exhaust gas turbocharger 2 to which an exhaust gas channel 4, which leads to an SCR catalytic converter 3, is connected. An exhaust gas channel 5, which a measurement space 6 with a $NO_X$ sensor 7 adjoins, is located downstream of SCR catalytic converter 3. An ammonia-eliminating compound such as urea or ammonium formate in a solid form or in a solution form can, for example, be supplied upstream of SCR catalytic converter 3 as the reducing agent.

Figure 2A:
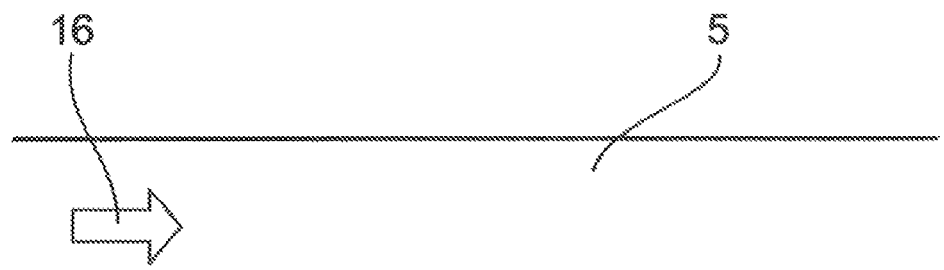
FIG. 2a shows the arrangement of a sensor in a measurement space which adjoins an exhaust gas channel.
Figure 2A:
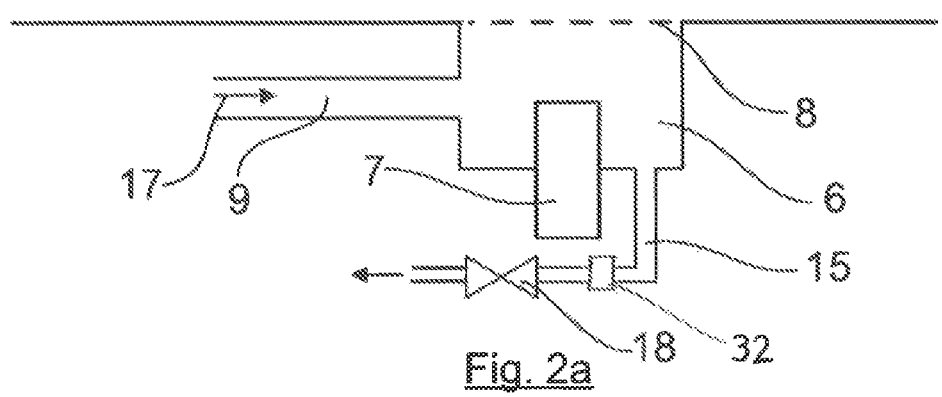

Measurement space 6 is, as represented in detail in FIG. 2a, fluidically connected to exhaust gas channel 5 via a gas-permeable membrane 8. In order to be able to introduce flushing gas, air or a calibration gas into measurement space 6, a gas line 9 is connected to measurement space 6, via which gas line 9, for example, air can be supplied according to arrow direction 10 via a controllable valve 11 as flushing gas. The air is branched off on the outlet side of a compressor 12 which is part of turbocharger 2 and reaches measurement space 6 when valve 11 is open. Compressor 12 serves here as a pressure generator and is part of exhaust gas turbocharger 2 which is driven by the exhaust gas of internal combustion engine 1 via turbine 13 of turbocharger 2.

In the exemplary embodiment of FIG. 1, a calibration gas can be fed via gas line 9 into measurement space 6 via a second controllable valve 14. In this case, valve is closed. The calibration gas has a predefined $NO_X$ concentration, as a result of which, for example, a correction factor for the $NO_X$ sensor can be determined if the measurement value determined by the $NO_X$ sensor deviates from the actual value of the supplied $NO_X$ concentration.

The region where measurement space 6 adjoins exhaust gas channel 5 is represented in an enlarged form in FIG. 2a. A $NO_X$ sensor 7 which is connected electrically to a measurement system, which is not represented in greater detail, protrudes into measurement space 6. Gas line 9 represented in FIG. 1 and a further intake line 15 are furthermore connected to the measurement space. Measurement space 6 is partially shielded from the exhaust gas flow, which flows through exhaust gas channel 5 in arrow direction 16, by a gas-permeable membrane 8 which forms a shielding device.

If air or any other flushing gas is supplied according to arrow direction 17 into measurement chamber 6 via gas line 9, intake line 15 being shut off by a closed valve 18, this has the result that any exhaust gas present is displaced out of measurement chamber 6 through membrane 8 into exhaust gas channel 5. Only air or flushing gas is then located in measurement space 6 so that $NO_X$ sensor 7 is relieved of damaging exhaust gas influences. This status is maintained in measurement pauses until a measurement phase for measuring the $NO_X$ concentration follows. In order to introduce a measurement phase, in the exemplary embodiment shown according to FIG. 2a, exhaust gas is sucked via intake line 15 with valve 18 open into measurement space 6 through membrane 8. A filter 32 is arranged in the intake line 15 as a sulphur trap. Gas line 9 is shut off during the measurement phase. As a result of the intake of exhaust gas into measurement space 6, it is achieved that $NO_X$ sensor 7 is rapidly and fully exposed to exhaust gas. The measurement of the $NO_X$ concentration is now carried out for the provided duration of the measurement phase.

The duration and frequency of the measurement phases can be set or changed depending on the operating state of the internal combustion engine and/or of the exhaust gas aftertreatment system.

As soon as the $NO_X$ measurement is carried out, the measurement phase is terminated. Valve 18 is initially closed here and then air or any other flushing gas is fed into measurement space 6 via gas line 9.

Figure 2B:
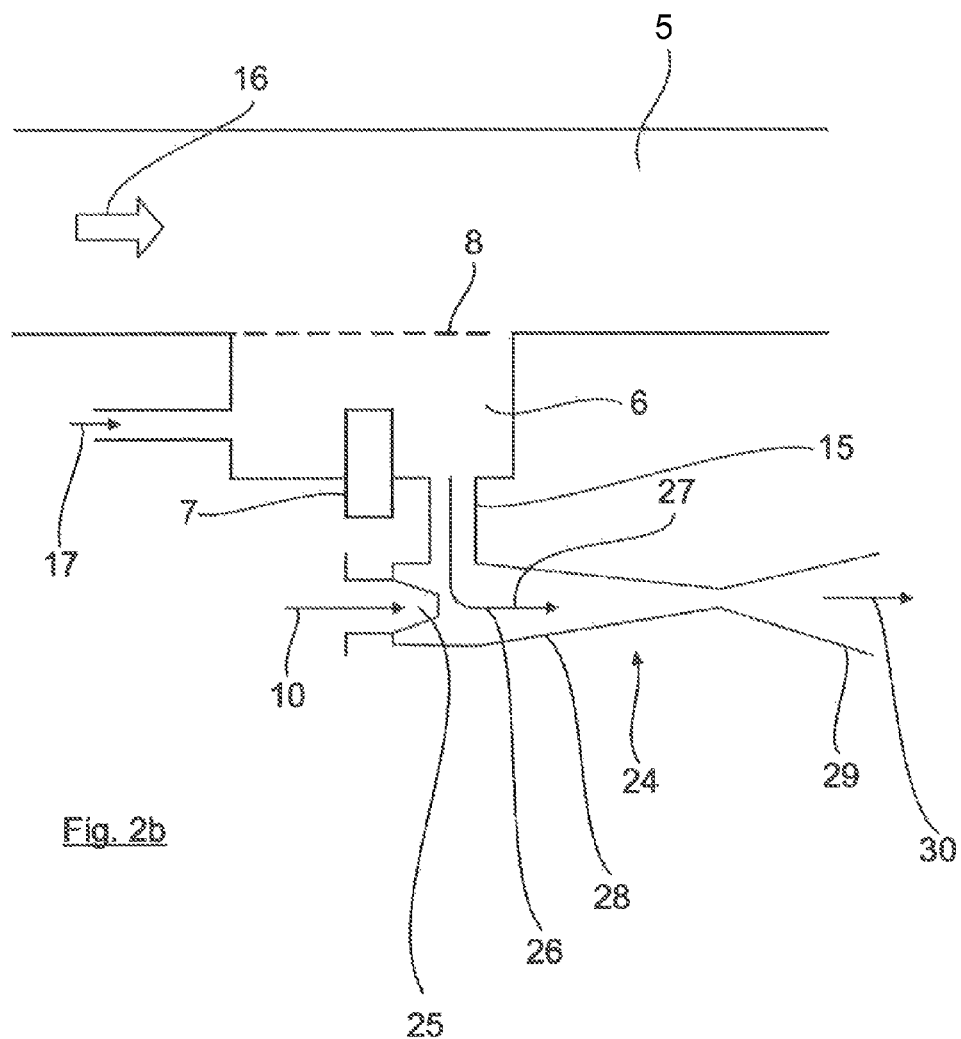
FIG. 2b shows the arrangement of a sensor in a measurement space which adjoins an exhaust gas channel according to an alternative configuration.

FIG. 2b shows an alternative configuration to FIG. 2a, in the case of which the intake of exhaust gas into measurement space 6 is carried out with the help of a jet pump 24 (a Venturi nozzle arrangement based on the same active principle could alternatively also be provided) and compressed air or, as represented by way of example here, in the case of turbo-charged internal combustion engines, compressed charge air 10 is used as the propellant. The compressed air or compressed charge air 10 exits at as high as possible speed out of jet nozzle 25, as a result of which according to Bernoulli's Law a dynamic drop in pressure occurs which brings about the intake of exhaust gas (corresponding to arrow 27) into jet pump 24, as a result of which exhaust gas is also sucked into measurement space 6. In concrete terms, in a mixing chamber 26 of jet pump 24, the propulsive jet formed by compressed or charged air 10 hits the exhaust gas, as a result of which the exhaust gas is accelerated and carried along. Since the exhaust gas in mixing chamber 26 is accelerated, a section effect arises which conveys further exhaust gas via intake line 15 formed here as an intake nozzle. A diffuser 29 is connected downstream where applicable for a further rise in pressure. Mixing flow 30 which leaves jet pump 24 can then, for example, be returned to the exhaust gas system or used in a different manner.

FIG. 3 shows a preferred design of a measurement space 19 which is arranged in an exhaust gas channel 5 and is formed by two perforated cylinders 20, 21 which are arranged concentrically in one another. $NO_X$ sensor 7 protrudes into measurement space 19. A gas line 9 is connected to measurement space 19, via which gas line 9 air or flushing gas or calibration gas can be conducted into measurement space 19. Gas line 9 can be shut off by means of a controllable valve 11.

Outer cylinder 20 and inner cylinder 21 have, in the exemplary embodiment shown, bores 22, 23 arranged offset in each case by 180 degrees (FIG. 4). These bores 22, 23, as in the sectional view of FIG. 4, are not arranged flush in FIG. 3 so that measurement space 19 is shut off for the exhaust gas flow. Inner cylinder 21 is, however, rotatable according to the represented double arrow by 90 degrees into a position which is represented in FIG. 5. In this position, bores 22, 23 are flush so that part of the exhaust gas flow can flow in and through measurement space 19. In the position according to FIG. 5, measurement space 19 is open for the exhaust gas flow so that $NO_X$ sensor 7 can perform a measurement of the $NO_X$ concentration. If inner cylinder 21 is, however, located in the position as is represented in FIG. 4, the system is in a measurement pause in which flushing gas can be introduced via gas line 9 into measurement space 19.

A further intake line not represented here can be connected to measurement space 19 in order to be able to introduce gas unhindered via gas line 9 with a closed measurement space 19. Cylinders 20, 21 can, however, also have gas-permeable regions in order to be able to carry out the flushing procedure with flushing gas in an accelerated manner.

The embodiments according to the invention described above were only described in greater detail by way of example on the basis of a $NO_X$ sensor. The present invention is, however, not restricted thereto and can not only be used to increase the service life of $NO_X$ sensors but also of other sensors for determining exhaust gas components. These include, among other things, $NH_3$ sensors, lambda sensors and unburnt carbon sensors, to cite only a few examples.

The invention claimed is:

1. A method for operating a sensor in an exhaust gas system of an internal combustion engine for determining the emissions contained in an exhaust gas flow, comprising the steps of:
    allowing the exhaust gas flow to act on the sensor in a measurement space surrounding the sensor during measurement phases; and
    keeping the sensor free from the exhaust gas flow between the measurement phases, by exposing the measurement space to a flushing gas immediately after each of the measurement phases, such that exhaust gas present in the measurement space is displaced out of the measurement space into the exhaust gas flow.

2. The method of claim 1, wherein the emissions determined by the sensor include at least one of nitrogen oxides, ammonia, oxygen, and unburnt carbon.

3. The method of claim 1, wherein the flushing gas is air.

4. The method of claim 1, further comprising the step of exposing the sensor to a calibration gas in calibration phases.

5. The method of claim 1, wherein the flushing gas is fed into the measurement space by one of a fan and a compressor.

6. The method of claim 1, wherein the flushing gas delivered to the measurement space from a pressure side of a compressor of an exhaust gas turbocharger.

7. The method of claim 1, further comprising the step of determining one of a duration or frequency of the measurement phases as a function of current or differentiated operating parameters of at least one of the internal combustion engine and an exhaust gas after-treatment system.

8. The method of claim 7, wherein the current or differentiated current or differentiated operating parameters include at least one of injection pressure, start of injection, boost pressure, charge air temperature, number of operated engine cylinders, turbocharger rotational speed, raw emissions of the exhaust gas components, number of injections, exhaust gas temperature, catalytic converter temperature, fuel consumed, and quality of reducing agent supplied.

9. The method of claim 1, wherein exhaust gas is drawn into the measurement space during the measurement phases.

10. The method of claim 9, wherein the intake of exhaust gas into the measurement space is accomplished using a vacuum present on a fresh air intake side of the engine.

11. The method of claim 9, wherein the exhaust gas is drawn into the measurement space through a sulfur trap having a compound suitable for bonding sulfur oxides from exhaust gas.

12. The method of claim 11, wherein the compound comprises one of $Ca(OH)_2$, activated carbon, or $CaO$.

13. The method of claim 9, wherein the intake of exhaust gas into the measurement space is carried out by a jet pump using compressed air.

14. The method of claim 13, wherein the compressed air is charging air from a turbocharger of the internal combustion engine.

15. The method of claim 1, wherein concentrically arranged cylinders form the measurement space, the cylinders each having cylinder walls with bores or perforations forming selectably closable passage openings, the method comprising closing the passage openings to shut off the measurement space from the exhaust gas flow.

16. The method of claim 1, wherein the step of exposing the measurement space to a flushing gas includes exposing the measurement space to a pressurized flushing gas.

17. A device for an exhaust gas regulation system of an internal combustion engine, comprising:
 a sensor for determining emissions contained in an exhaust gas flow;
 a measurement space shielded from the exhaust gas flow by an at least partially gas-permeable shielding device, the sensor being arranged in the measurement space; and
 a gas channel connected to the measurement space, wherein a flushing gas is introducible into the measurement space by the gas channel for keeping the measurement space free of exhaust gas flow between measurement phases.

18. The device of claim 17, wherein the shielding device is a gas-permeable membrane arranged between the exhaust gas channel and measurement space.

19. The device of claim 17, further comprising concentrically arranged cylinders forming the measurement space, the cylinders each having cylinder walls with bores or perforations forming selectably closable passage openings.

20. The device of claim 17, further comprising an intake line connected to the measurement space for drawing exhaust gas into the measurement space.

21. The device of claim 20, further comprising a controllable valve disposed in the intake line and the intake line is connected to a fresh air intake side of the internal combustion engine.

22. The device of claim 20, further comprising a jet pump arranged in the intake line using compressed air as the propellant.

23. The device of claim 22, wherein compressed charge air from a turbocharged internal combustion engine is used as a propellant for the jet pump.

24. The device of claim 20, further comprising a filter device serving as a sulfur trap, wherein exhaust gas drawn through the intake line flows through the filter device to a fresh air intake side of the internal combustion engine.

25. The device of claim 17, further comprising a gas line connected to the measurement space for introducing a calibration gas into the measurement space.

26. A vehicle having an internal combustion engine and exhaust gas regulation system with a device according to claim 17.

* * * * *